United States Patent
Mellander et al.

(10) Patent No.: US 12,172,315 B2
(45) Date of Patent: Dec. 24, 2024

(54) ROBOT CONTROLLER

(71) Applicant: ABB Schweiz AG, Baden (CH)

(72) Inventors: Roger Mellander, Västerås (SE); Roger Dahlgren, Västerås (SE)

(73) Assignee: ABB Schweiz AG, Baden (CH)

( * ) Notice: Subject to any disclaimer, the term of this patent is extended or adjusted under 35 U.S.C. 154(b) by 218 days.

(21) Appl. No.: 17/996,746

(22) PCT Filed: Apr. 27, 2020

(86) PCT No.: PCT/EP2020/061592
§ 371 (c)(1),
(2) Date: Oct. 20, 2022

(87) PCT Pub. No.: WO2021/219191
PCT Pub. Date: Nov. 4, 2021

(65) Prior Publication Data
US 2023/0219222 A1    Jul. 13, 2023

(51) Int. Cl.
*B25J 9/16*    (2006.01)

(52) U.S. Cl.
CPC .......... *B25J 9/1656* (2013.01); *B25J 9/1674* (2013.01)

(58) Field of Classification Search
CPC ... B25J 9/1674; B25J 9/1656; G05B 19/0428; G05B 2219/25068; G05B 2219/33125; G05B 2219/36547; G05B 2219/23464; Y02P 90/02
See application file for complete search history.

(56) References Cited

U.S. PATENT DOCUMENTS

| | | | | |
|---|---|---|---|---|
| 2004/0039478 A1* | 2/2004 | Kiesel | ................. | G05B 19/042 700/174 |
| 2006/0095547 A1* | 5/2006 | Cohn | ................. | H04L 67/5681 709/220 |
| 2007/0076749 A1* | 4/2007 | Anantha-Raju | ...... | G06Q 10/087 370/466 |

(Continued)

FOREIGN PATENT DOCUMENTS

| | | | |
|---|---|---|---|
| EP | 2801934 A1 | 11/2014 | |
| EP | 3101491 A1 | 12/2016 | |

OTHER PUBLICATIONS

International Search Report and Written Opinion of the International Searching Authority; Application No. PCT/EP2020/061592; Completed: Dec. 14, 2020; Mailing Date: Dec. 22, 2020; 15 Pages.

*Primary Examiner* — Adam R Mott
*Assistant Examiner* — Sagar Kc
(74) *Attorney, Agent, or Firm* — Whitmyer IP Group LLC

(57) ABSTRACT

A robot controller is configured to control operation of at least one industrial robot. The robot controller includes: a processor; a memory configured to store a current system configuration of the robot controller, and an editing interface configured to enable modification of the current system configuration. It further includes a stored fingerprint corresponding to the system configuration according to original manufacturer settings; and a fingerprinting interface configured to facilitate computation of a fingerprint based on the current system configuration. The stored and computed fingerprints may be compared to determine whether any modification has occurred.

16 Claims, 1 Drawing Sheet

(56) References Cited

U.S. PATENT DOCUMENTS

| | | | |
|---|---|---|---|
| 2008/0109568 A1* | 5/2008 | Rengarajan | H04L 41/0869 710/19 |
| 2010/0071057 A1* | 3/2010 | Plache | G05B 19/045 726/17 |
| 2010/0114371 A1* | 5/2010 | Tsusaka | B25J 9/0084 700/250 |
| 2013/0031037 A1* | 1/2013 | Brandt | H04L 63/1408 706/12 |
| 2016/0359825 A1* | 12/2016 | Chand | G06F 21/64 |
| 2018/0026835 A1* | 1/2018 | Nachimuthu | H04L 43/08 |
| 2019/0065786 A1* | 2/2019 | Young | H04L 9/3247 |
| 2019/0095263 A1* | 3/2019 | Lahav | G06F 11/3051 |
| 2019/0205552 A1* | 7/2019 | Espinosa | H04L 9/0637 |
| 2020/0078937 A1* | 3/2020 | Sun | G05B 15/02 |
| 2021/0271430 A1* | 9/2021 | Haapanen | G06F 3/1257 |

* cited by examiner

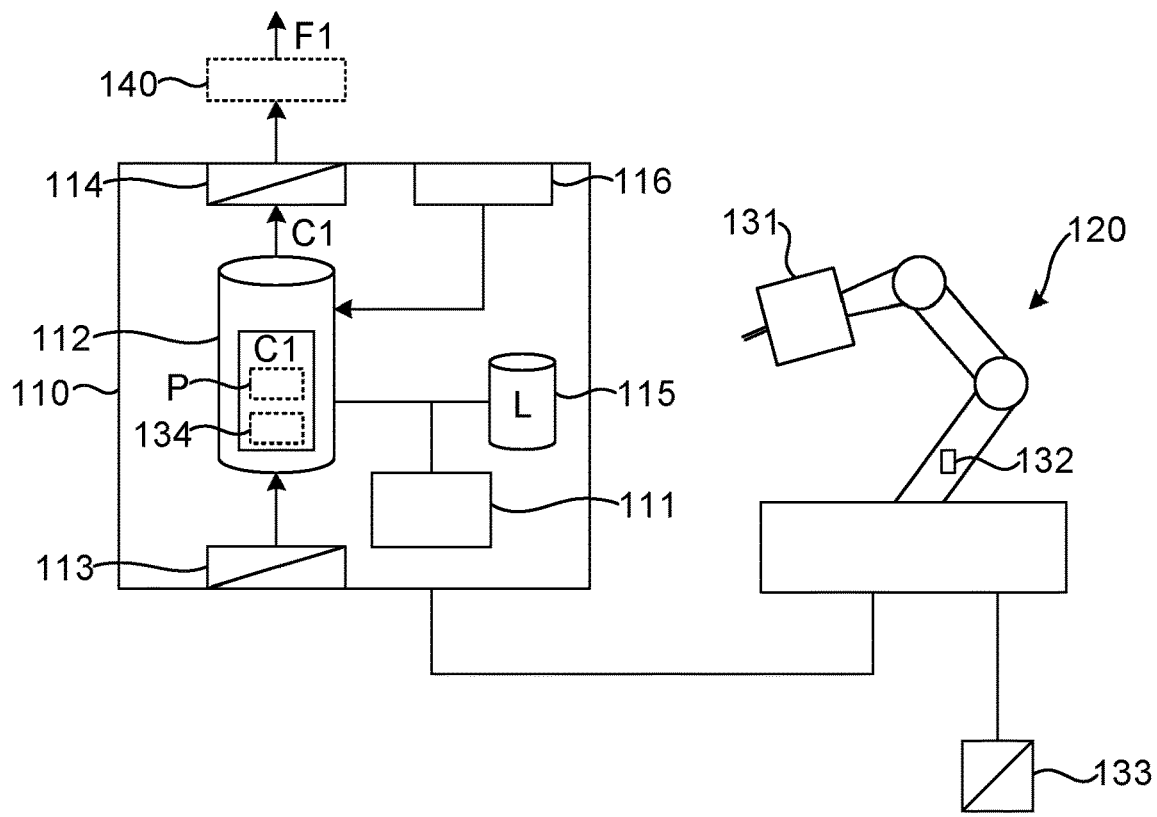
Fig. 1
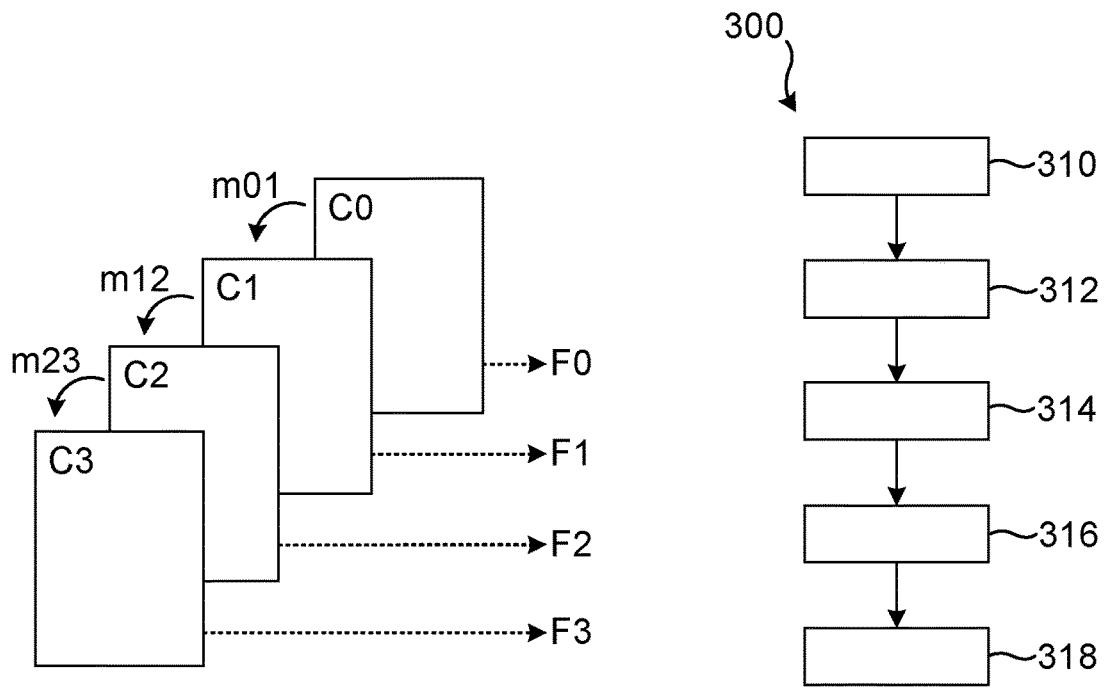
Fig. 2
Fig. 3

ROBOT CONTROLLER

TECHNICAL FIELD

The present disclosure relates to the field of robotic control and, in particular, to methods and devices for managing a system configuration of a robot controller.

BACKGROUND

A robot controller controls movements and other behavior of a robot in accordance with a system configuration. The system configuration may include:
- contributions by an original manufacturer, such as an operating system, basic settings, robot software implementing movements, sensing, self-monitoring, and further generically useful functionalities and services;
- contributions by a robot system integrator, such as task- or role-specific configurations or configuration templates;
- contributions by an end user, such as local settings and project-specific data; and
- contributions by an external maintenance agent, such as subsequent changes to the system configuration aiming to overcome malfunction, improve interoperability, fix software errors, or the like.

The integrator referred to above is responsible for specializing the robot and/or robot controller as manufactured—partly completed machinery—to perform automated manufacturing or processing tasks. The integration may include programming the robot controller, equipping the robot with manipulators (end effectors) and other tools and/or connecting it to other devices, thereby turning it into completed machinery. For efficiency reasons, the integration is often outsourced, e.g., entrusted to an organization that is neither the robot manufacturer nor the end user.

As explained, the integrator may be an intermediary in the value chain from the original manufacturer to the end user, in which case it involves at least two commercial transactions. At each transaction, when the robot controller passes from one party to another, a need for quality assurance arises. To this end, the robot controller delivered to the end user may carry physical or virtual labels, markings or documents corresponding to various quality-, safety- or compatibility-related norms, such as a European Community (CE) mark or Federal Communications Commission (FCC) label. The act of marking the robot controller may constitute a declaration by the original manufacturer that the robot controller (as partly completed machinery) conforms to the applicable standards, or, if the declaration is made by the integrator, that the robot controller (as completed machinery) is conformant. The marking may also relate to successful acceptance testing, such as the passing of a factory acceptance test (FAT), which may follow a standardized or customer-defined protocol.

The robot controller remains norm-conformant, as declared, as long as its essential hardware and software remain unchanged in all relevant aspects and as long as no unauthorized components are added. While changes and damage to hardware are relatively easy to detect, the means for detecting post-declaration modifications to the system configuration appear underdeveloped at present.

SUMMARY

One objective of the invention is to make available a robot controller allowing easy determination of whether the system configuration according to original manufacturer settings has been modified. Another objective is to make available a method for determining whether any modification to a system configuration of a robot controller has occurred. These and other objectives are solved by the invention according to the independent claims. Advantageous embodiments are defined by the dependent claims.

In a first aspect of the invention, there is provided a robot controller configured to control operation of at least one industrial robot, wherein the robot controller comprises: a processor, a memory configured to store a current system configuration $C1$ of the robot controller, and an editing interface configured to enable modification of the current system configuration. In one embodiment, the robot controller stores a fingerprint $F0$ corresponding to the system configuration according to original manufacturer settings $C0$. Further, the robot controller comprises a fingerprinting interface configured to facilitate computation of a fingerprint $F1$ based on the current system configuration.

By computing the fingerprint $F1$ for the current system configuration and comparing it with the stored fingerprint $F0$, it can be determined whether the system configuration has changed ($F1 \neq F0$) or not ($F1=F0$). Access to the fingerprint therefore enables an informed decision on whether to keep operating the robot controller normally, to disable the robot controller and/or robot to some degree, reinstall an original system configuration to ensure standard conformity etc. The fingerprinting ability realizes a change control in the robot controller.

As used herein, a "fingerprint" is an image of the system configuration under a mapping with a high sensitivity to small changes. The image is preferably of a manageable size, such as not more than some tens or hundreds of characters, i.e., typically several orders of magnitude smaller than the system configuration. A "fingerprint" in this sense may be referred to as a checksum, digest or hash.

Further, "original manufacturer settings" refers to the state in relation to which it is desired to detect modifications. One use case is to ascertain that the integrator has not undertaken modifications in such portions of the system configuration that are relevant to a standard certification given to the robot controller as originally manufactured. If attention is instead directed to post-integration modifications, then effectively the system configuration as delivered by the integrator will be considered to be "according to original manufacturer settings", other things equal. In other words, the system configuration according to original manufacturer settings may include information provided by an integrator.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise.

In some embodiments, the robot controller's fingerprinting ability also allows detection of new or changed extensions in the robot controller and robot. Accordingly, even if the system configuration itself is intact, a deviation from the expected fingerprint may indicate that possibly unsuitable extensions have been connected.

In other embodiments, the robot controller includes a log file describing any modifications to the system configuration. This may be a useful resource when a modification has been detected by means of the simple fingerprint-based test, as it allows the location and other specifics of the modification to be determined without the need for a direct comparison of the two system configurations.

In still other embodiments, the robot controller includes a lockdown functionality for selectively blocking modifications of designated content in the memory. The lockdown functionality can be turned on and off only by the original manufacturer and any delegates who have been appointed by the original manufacturer, such as the integrator. While the fingerprinting presents a way to detect unwanted modifications to the system configuration, the lockdown functionality may reduce the chances that they occur at all.

In a second aspect of the invention, there is provided a method of managing a system configuration of a robot controller configured to control operation of at least one industrial robot. In one embodiment, the method comprises: storing a fingerprint corresponding to the system configuration according to original manufacturer settings; enabling modification of the current system configuration; computing a fingerprint of the current system configuration; and comparing the fingerprint of the current system configuration and the stored fingerprint corresponding to the system configuration according to original manufacturer settings, to determine whether any modification has occurred. This information can be used in a similar way, and with similar benefits, as outlined above.

In specific embodiments, the fingerprint corresponding to the system configuration according to original manufacturer settings may be stored in the robot controller, in the connected device or in an external or portable memory.

The method may be performed by the robot controller autonomously or may be performed by a device temporarily connected to the robot controller. The method may furthermore be implemented as a computer program, which can be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storages of the magnetic, optical or solid-state type. Still within the scope of "data carrier", such memories may be fixedly mounted or portable.

BRIEF DESCRIPTION OF THE DRAWINGS

Aspects and embodiments are now described, by way of example, with reference to the accompanying drawings, on which:

FIG. 1 shows an industrial processing system comprising an industrial robot and a robot controller according to an embodiment of the invention;

FIG. 2 illustrates versions of a system configuration of a robot controller, which have been obtained by successive modifications; and FIG. 3 is a flowchart of a method according to an embodiment of the invention.

DETAILED DESCRIPTION

The aspects of the present invention will now be described more fully hereinafter with reference to the accompanying drawings, on which certain embodiments of the invention are shown. The invention may, however, be embodied in many different forms and the described embodiments should not be construed as limiting; rather they are provided by way of example so that this disclosure will be thorough and complete, and to fully convey the scope of all aspects of invention to those skilled in the art.

FIG. 1 is a schematic illustration of an industrial processing system 100 including an industrial robot 120, a robot controller 110 and various extensions 131, 132, 133, 134 integrated with these.

The robot controller 110 comprises a processor 111, which may be provided as a single processor or as processing circuitry with multiple connected sub-processors. The robot controller 110 further comprises a memory 112 configured to store the current system configuration C1, which controls the operation of the robot controller 110. The categories of data comprised in the system configuration C1, and their respective contributors in a typical case, have been exemplified above. The memory 112 may store further data in addition to the system configuration C1.

The robot controller further comprises an editing interface 113 by which an operator can modify the current system configuration C1. The editing interface 113 may optionally allow the operator to inspect or export the system configuration C1, or to upload a prepared system configuration. The editing interface 113 may be configured for direct interaction with the operator, e.g. via a graphical user interface, or for being connected in a wired, wireless or networked/remote fashion to an intermediary device (not shown) constituting the human-machine interface. As an alternative or addition to embodiments where the editing interface 113 modifies the current system configuration in accordance with user input, the editing interface 113 may alternatively be configured to modify the current system configuration autonomously. Such autonomous modifications may be based on automated decision-making using data collected during the operation of the robot controller 110, e.g., by means of machine learning.

The robot controller 110 further comprises a fingerprinting interface 114 configured to facilitate computation of a fingerprint F1 based on the current system configuration C1. For this purpose, the fingerprinting interface 114 has access rights to the stored system configuration C1 or is authorized to request a copy of it; this is illustrated by the vertical arrow from the memory 112. In accordance with some embodiments, the fingerprinting interface 114 allows a connected external processor 140 to compute the fingerprint F1 on the basis of the current system configuration C1. The external processor 140 may for example form part of a portable computer or handheld device. In other embodiments, the fingerprinting interface is configured to compute the fingerprint F1, e.g., by evaluating a mapping of the type described above using the current system configuration C1 as input.

Whether the fingerprint F1 is computed internally or externally, it can be compared with a stored fingerprint F0 corresponding to the system configuration C0 according to original manufacturer settings, to determine whether the system configuration has changed or not. Since, as mentioned, a fingerprint is preferably of a manageable size, the comparison is much less computationally demanding than a full comparison of the system configurations C0 and C1. The case of no change (F1=F0) may be considered to mean that normal operation is allowed to continue. If instead the system configuration is found to have changed (F1≠F0), a safety-relevant action may be taken. The safety-relevant action may be executed by internal and/or external entities, independently of whether the fingerprint F1 was internally or externally computed. A safety-relevant action may affect the robot controller 110 and/or the robot 120 and may imply one or more of the following: a complete emergency stop, activation of a restricted mode, activation of a logged or supervised mode, sending of a safety alert etc.

In various embodiments, the industrial robot 120 and robot controller 110 may have one or more hardware and software extensions. This is illustrated in FIG. 1 by the manipulator 131, sensor 132 and communication interface 133 associated with the robot 120, and by the external software (plugin) 134 in the memory 112 of the robot controller 110. The external software 134, which may be included in the system configuration C1, may consist of executable software code and/or settings which are to be applied during the execution. For example, a hardware extension may be accompanied by a software driver providing an interface for controlling the hardware extension, such as a PLC program. A hardware extension may also contain firmware. Some or all of these extensions did not form part of the originally manufactured equipment but have been subsequently added by an integrator, end user, maintenance agent or another party. The extensions 131, 132, 133, 134 may in particular be detachable or dissociable from the robot 120 or robot controller 110.

Since the use of unsuitable extensions may jeopardize the functioning, safety or interoperability of the robot controller 110, the fingerprinting according to some embodiments covers (or reflects) not only the current system configuration C1 but also the current set of extensions 131, 132, 133, 134. In particular, the fingerprint F1 to be computed may depend on one or more of: a presence of an extension, an identity or device type of the extension, a current setting of the extension, a status of the extension (e.g., active, inactive, failure), a version of the extension (especially for a software extension), a total number of extensions. The selection of which among these options to use may be based on factors such as the sensitivity of the robot controller and the aspects of the robot 120 and robot controller 110 that are of relevance to a preceding safety certification.

The robot controller 110 optionally comprises a protected memory 115. The protected memory 115 may be protected against illicit access by encryption and similar measures. The protected memory 115 is used at least to store a log file L describing any modifications to the system configuration. In some embodiments, access to the protected memory 15 is restricted to the original manufacturer and any appointed delegates, such as the integrator and/or a component (not shown) responsible for incrementally extending the log file L as new modifications are undertaken. In other embodiments, write access is restricted to the original manufacturer and its delegates, while read access is granted more liberally; for instance, an end user of the robot controller 110 may be allowed to inspect the log file L but not make changes to it. Accordingly, the log file L will provide reliable documentation of the modifications made, as may be discovered by a comparison of fingerprints F0, F1 in the manner described above. More precisely, the log file L can be analyzed in order to efficiently locate a modification which is known, through fingerprinting, to exist. This avoids the time-consuming option of a direct comparison of two or more system configurations.

The concept of "modifications to the system configuration" may be under-stood to mean such modifications which were applied to previous versions of the system configuration. Equivalently, these "modifications" are those which led up to the current system configuration by being applied to respective earlier versions thereof. "Modifications" in the sense of the invention are illustrated by FIG. 2, which shows an initial system configuration C0, corresponding to original manufacturer settings, a first modified system configuration C1, a second, later modified system configuration C2, and a current system configuration C3. The four system configurations correspond, under the same fingerprinting mapping (suggested by horizontal broken-line arrows), to fingerprints F0, F1, F2 and F3. The modifications that relate consecutive modifications are illustrated by the curved arrows. For example, the first modified system configuration C1 is obtainable by applying modification m01 to the initial system configuration C0. Similarly, the second modified system configuration C2 is obtainable by applying modification m12 to the first modified system configuration C1. The third modification in the sequence is denoted m23. The log file may be structured as an ordered sequence of the modifications, L=(m01, m12, m23). The modifications may be said to be associative in the sense that, say, the second modified system configuration C2 is obtainable by applying modification m01 and then modification m12 to the initial system modification C0.

Generally speaking, the log file L cannot replace fingerprinting, since sequential modifications made during normal operation and maintenance may be mutually cancelling. Similarly, if for implementation reasons the logging covers all write calls to the memory 112—including those that actually do affect the system configuration—the log file L may contain redundant items. Therefore, the fact that the log file L has grown does not unambiguously mean that the system configuration has been modified.

Returning to FIG. 1, the robot controller 110 may comprise an optional lockdown functionality 116, which only the original manufacturer and its delegate (see examples above), if any, are authorized to activate and deactivate. When the lockdown functionality 116 is active, it blocks modifications to designated content in the memory 112. The content may be defined in terms of information type (e.g., code acting as the operating system, programs forming a basic software library) or in terms of memory location (e.g., an $n^{th}$ sector or segment of the memory 112). To illustrate, a portion P of the system configuration C1 in FIG. 1 has been indicated. The portion P may correspond to the safety-, quality- and/or interoperability-relevant components of the system configuration C1. Such components may include those which formed the basis of a preceding standard certification. In the interest of leaving the integrator and/or end user maximal liberty to configure the robot controller 110, however, the portion P may exclude components of the system configuration which are not relevant with respect to the certification.

The lockdown functionality 116 may be implemented by hardware or software or a combination thereof rendering it impossible to modify the designated content; this may include changing access rights in a pre-existing access management component of the operating system, operating a switch, disabling a critical root directory or allocation table of the memory 112 and the like.

In one embodiment, the lockdown functionality 116 is configured to detect unused content in the memory 112. For example, the lockdown functionality 116 may look for services (e.g., APIs) or functionalities of the robot controller 110 as originally manufactured which the integrator's software, settings or extensions have not used. The lockdown functionality 116 may then query the integrator whether it wishes to maintain these services or functionalities active or they can be blocked by activating the lockdown functionality 116. Accordingly, this embodiment offers a configuration aid supporting the integrator's configuration of the lockdown functionality 116 in that it recommends a proposed extent of the designated content for which modifications are to be blocked. In a similar way, the configuration aid may be at the service of another party who is authorized to activate the lockdown functionality 116.

FIG. 3 is a flowchart of a method 300 for managing a system configuration of a robot controller configured to control operation of an industrial robot, as exemplified by the entities of the industrial processing system 100 in FIG. 1. The method 300 may be performed by circuitry within the robot controller 110 or by an external device communicating, at least temporarily, with the robot controller 110. Alternatively, though still within the scope of the invention, the method 300 may be performed jointly by the robot controller 110 and an external device.

In a first step 310, a fingerprint F0 corresponding to the system configuration according to original manufacturer settings C0 is stored, either in the robot controller 110 or in an external memory (not shown) which is accessible to the entity performing the method 300.

If the method 300 is performed by the robot controller 110, then, in an optional second step 312, the robot controller 110 executes a current system configuration C1, e.g., by operating as specified in the current system configuration C1.

In a third step 314, which may overlap in time with at least the first and second steps 310, 312, it is possible to modify the system configuration. More precisely, the robot controller 110 accepts modifications according to user input, an uploaded substitute configuration file, automatically decided modifications etc. It is such modifications that may cause the modified system configuration to deviate from norm-compliant, original manufacturer settings to such an extent that the robot controller 110 ceases to be norm-compliant.

In a fourth step 316, a fingerprint F1 of the current system configuration C1 is computed.

In a fifth step 318, the computed fingerprint F1 of the current system configuration C1 is compared with the stored fingerprint F0 corresponding to the system configuration according to original manufacturer settings C0. The result of the comparison allows a conclusion as to whether any modification has occurred.

The aspects of the present invention have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robot controller configured to control operation of at least one industrial robot, wherein the robot controller comprises:
   a processor;
   a memory configured to store a current system configuration of the robot controller;
   an editing interface configured to enable modification of the current system configuration;
   a stored fingerprint corresponding to the system configuration according to original manufacturer settings;
   a fingerprinting interface configured to facilitate computation of a fingerprint based on the current system configuration; and
   a lockdown functionality activatable and inactivatable only by the original manufacturer and any appointed delegates, wherein the lockdown functionality when activated blocks modifications of designated content in the memory.

2. The robot controller of claim 1, wherein the fingerprint to be computed is further based on an extension which is currently associated with the robot controller or the industrial robot, wherein the extension is a hardware device and/or software code.

3. The robot controller of claim 2, wherein the fingerprint to be computed depends on at least one of: a presence of the extension; an identity of the extension; settings of the extension; a status of the extension; a version of the extension; a total number of extensions.

4. The robot controller of claim 2, further comprising:
   protected memory accessible only by the original manufacturer and any appointed delegates; and
   a log file stored in the protected memory describing any modifications to the system configuration.

5. The robot controller of claim 1, further comprising:
   protected memory accessible only by the original manufacturer and any appointed delegates; and
   a log file stored in the protected memory describing any modifications to the system configuration.

6. The robot controller of claim 5, wherein the appointed delegates include an integrator.

7. The robot controller of claim 1, wherein the lockdown functionality when activated blocks modifications of a designated portion of the system configuration.

8. The robot controller of claim 1, wherein the lockdown functionality is configured to detect unused content in the memory and propose it as designated content for which modifications are to be blocked.

9. The robot controller of claim 1, wherein the system configuration according to original manufacturer settings includes information provided by an integrator.

10. The robot controller of claim 1, wherein the fingerprinting interface allows a connected external processor to compute the fingerprint.

11. The robot controller of claim 1, wherein the fingerprinting interface is configured to compute the fingerprint.

12. The robot controller of claim 1, wherein the editing interface is configured to autonomously modify the current system configuration on the basis of data collected during operation of the robot controller.

13. The robot controller of claim 1, wherein the editing interface is configured to modify the current system configuration in accordance with user input.

14. The robot controller of claim 1, wherein the appointed delegates include an integrator.

15. An industrial processing system comprising:
   at least one industrial robot and a robot controller configured to control operation of the at least one industrial robot,
   wherein the robot controller includes:
   a processor;
   a memory configured to store a current system configuration of the robot controller;
   an editing interface configured to enable modification of the current system configuration;
   a stored fingerprint corresponding to the system configuration according to original manufacturer settings;
   a fingerprinting interface configured to facilitate computation of a fingerprint based on the current system configuration; and
   a lockdown functionality activatable and inactivatable only by the original manufacturer and any appointed delegates,
   wherein the lockdown functionality when activated blocks modifications of designated content in the memory.

16. A method of managing a system configuration of a robot controller configured to control operation of at least one industrial robot, the robot controller comprising a memory configured to store a current system configuration of the robot controller, the method comprising:
   storing a fingerprint corresponding to the system configuration according to original manufacturer settings;

enabling modification of the current system configuration;
computing a fingerprint of the current system configuration;
comparing the fingerprint of the current system configuration and the stored fingerprint corresponding to the system configuration according to original manufacturer settings, to determine whether any modification has occurred; and
activating and inactivating a lockdown functionality only by the original manufacturer and any appointed delegates,
wherein the lockdown functionality when activated blocks modifications of designated content in the memory.

* * * * *